(12) United States Patent
Schwartz et al.

(10) Patent No.: US 12,015,500 B2
(45) Date of Patent: Jun. 18, 2024

(54) SYSTEM AND METHOD FOR A CONTROL SYSTEM FOR MANAGING SMART DEVICES IN A MULTIPLE UNIT PROPERTY ENVIRONMENT

(71) Applicant: LEVEL UP HOLDING CO., INC., Glendale, AZ (US)

(72) Inventors: John H. Schwartz, Glendale, AZ (US); Joseph Butler, Gilbert, AZ (US)

(73) Assignee: Level Up Holding Co., Inc., Glendale, AZ (US)

( * ) Notice: Subject to any disclaimer, the term of this patent is extended or adjusted under 35 U.S.C. 154(b) by 318 days.

(21) Appl. No.: 17/464,006

(22) Filed: Sep. 1, 2021

(65) Prior Publication Data

US 2022/0070014 A1 Mar. 3, 2022

Related U.S. Application Data

(60) Provisional application No. 63/073,659, filed on Sep. 2, 2020.

(51) Int. Cl.
| | |
|---|---|
| *H04L 12/28* | (2006.01) |
| *G07C 9/29* | (2020.01) |
| *G08B 21/18* | (2006.01) |
| *H04W 4/80* | (2018.01) |
| *H04W 76/10* | (2018.01) |

(52) U.S. Cl.
CPC .............. *H04L 12/283* (2013.01); *G07C 9/29* (2020.01); *G08B 21/182* (2013.01); *H04L 12/281* (2013.01); *H04L 12/2829* (2013.01); *H04W 4/80* (2018.02); *H04W 76/10* (2018.02); *H04L 2012/2841* (2013.01)

(58) Field of Classification Search
CPC . H04L 12/283; H04L 12/281; H04L 12/2829; H04L 2012/2841; H04L 63/102; H04L 67/12; G07C 9/29; G07C 9/20; G08B 21/182; H04W 4/80; H04W 76/10; H04W 12/08
See application file for complete search history.

(56) References Cited

U.S. PATENT DOCUMENTS

| | | | |
|---|---|---|---|
| 2015/0112885 A1* | 4/2015 | Fadell ............... | G08B 29/185 705/330 |
| 2015/0120598 A1* | 4/2015 | Fadell ............... | G06Q 10/083 705/333 |
| 2015/0154850 A1* | 6/2015 | Fadell ............... | G06Q 10/083 340/501 |
| 2018/0336747 A1* | 11/2018 | Schoenfelder ..... | G07C 9/00571 |

* cited by examiner

*Primary Examiner* — Md Azad

(74) *Attorney, Agent, or Firm* — Noblitt & Newson, PLLC

(57) ABSTRACT

A control system for managing smart devices in a multi-unit property environment according to various aspects of the present technology may comprise a plurality of smart home systems, wherein a single smart home system is installed in each unit throughout the multi-unit property. The system may further comprise a smart community system comprising a plurality of community controllable smart devices installed throughout the multi-unit property. The smart home systems and the smart community system may each be configured to communicate with an access control system and infrastructure control system to allow individual residents to control the smart home system associated with their residence and have limited control over at least a portion of the community controllable smart devices through a single user interface.

15 Claims, 6 Drawing Sheets

SYSTEM AND METHOD FOR A CONTROL SYSTEM FOR MANAGING SMART DEVICES IN A MULTIPLE UNIT PROPERTY ENVIRONMENT

CROSS REFERENCES TO RELATED APPLICATIONS

This application claims the benefit of U.S. Provisional Patent Application No. 63/073,659, filed Sep. 2, 2020, and incorporates the disclosure of the application by reference.

BACKGROUND OF THE TECHNOLOGY

A smart device is an object that can be controlled without physical interaction. A smart device may be controlled by methods such as: self-control by artificial intelligence; pre-programming; or remote control through a physical or wireless network communication from a remote device. For example, a conventional light switch is controlled by physically manipulating the switch between an on and off position. A smart light switch may be controlled through physical manipulation but can also be programmed on a schedule or be controlled from a software application installed on smartphone or computer interface that is configured to communicate with the smart light switch. Similarly, a smart sensor can be enabled or disabled and can communicate its status remotely. For example, a smart motion sensor can relay the detection of motion within its sensing area as an alert to a smartphone, computer interface, or other device. Smart devices and smart sensors have long been installed by single-family residential homeowners to improve their comfort, convenience, and peace of mind, and there are many existing solutions in that space. Collectively, the concept of using smart devices and smart sensors in a residential context is known as "Smart Home."

Residents of multiple unit dwelling properties such as apartments, condominiums, dormitories, and offices want the ability to implement smart devices to create a Smart Home experience but they often have difficulty finding solutions because multiple unit dwelling properties require unique infrastructure to assign and isolate smart devices to individual residents, provide increased physical and electronic security, and support additional smart devices, systems, and information (e.g., community-accessible smart devices and shared information) that are seldom used or not relevant to standalone single family homes.

Because a multiple unit dwelling property serves as a home to multiple residents such as individuals, families, and roommates, existing individual smart devices belonging to residents may create problems if they are left behind by a resident after they move. For example, when a new resident moves into an apartment, they may not have access to or control of any smart home devices left behind in that apartment by the previous tenant. Similarly, prior art smart home platforms make no distinction between residents and managers/administrators (e.g., property manager); nor do prior art systems readily support either removing smart device control from former residents or reassigning control to new residents. In addition, because multiple independent parties share the same infrastructure in the multiple unit dwelling property, there is an increased need for both physical and electronic security of smart devices as compared with a single-family home.

A unique feature of multi-dwelling unit properties, shared communities, or office buildings is that amenities, common areas, or other features are intended to be shared by all residents of the multi-dwelling unit property, community, or office building. These amenities may include access control devices that grant or restrict access to specific areas, management of guests and visitors to the property perimeter access points, and package rooms for centralized management of package deliveries to residents. Traditionally, access to shared areas or features of multi-dwelling unit properties has been granted using physical credentials such as keys, key fobs, and access cards (RFID or bar coded). Physical credentials present an ongoing cost to property managers and property owners, especially when these physical credentials are lost, stolen, or not returned.

SUMMARY OF THE TECHNOLOGY

A control system for managing smart devices in a multi-unit property environment according to various aspects of the present technology may comprise a plurality of smart home systems, wherein a single smart home system is installed in each unit throughout the multi-unit property. The system may further comprise a smart community system comprising a plurality of community controllable smart devices installed throughout the multi-unit property. The smart home systems and the smart community system may each be configured to communicate with an access control system and infrastructure control system to allow individual residents to control the smart home system associated with their assigned residence and have limited control over at least a portion of the community controllable smart devices through a single user interface.

BRIEF DESCRIPTION OF THE DRAWINGS

A more complete understanding of the present technology may be derived by referring to the detailed description and claims when considered in connection with the following illustrative figures. In the following figures, like reference numbers refer to similar elements and steps throughout the figures.

Figure 1:
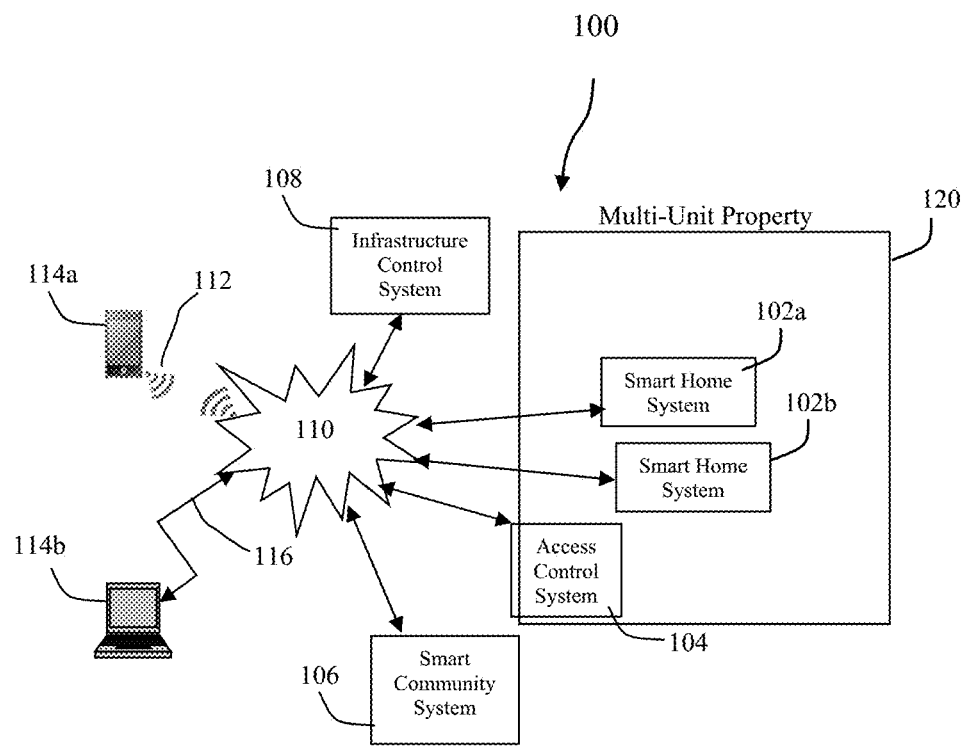
FIG. 1 representatively illustrates a block diagram of a control system for managing smart devices in accordance with an exemplary embodiment of the present technology.

Elements and steps in the figures are illustrated for simplicity and clarity and have not necessarily been rendered according to any particular sequence. For example, steps that may be performed concurrently or in a different order are illustrated in the figures to help to improve understanding of embodiments of the present technology.

DETAILED DESCRIPTION OF EXEMPLARY EMBODIMENTS

The present technology may be described in terms of functional block components and various process steps. Such functional blocks may be realized by any number of components configured to perform the specified functions and achieve the various results. For example, the present technology may employ various types of computing platforms and memory storage systems configured to operate over various types of communication networks, which may carry out a variety of operations suited to securely interacting with various types of smart devices. In addition, the embodiments described are merely exemplary applications for the technology. Further, the present technology may employ any number of conventional techniques for data storage and retrieval, transmitting data, communicating between devices, or otherwise managing smart devices.

Systems and methods for a control system for smart devices for multi-unit properties according to various aspects of the present technology may operate in conjunction with any type of smart device. Various representative implementations of the present technology may be applied to various types of smart home devices, electronic access points, and communication systems. For example, the described technology may be used to provide a resident of a multi-unit complex with a singular point of control for multiple smart devices associated with their individual residence and selected portions of the residence complex, and provide property managers with a system for providing and controlling access granted to each resident within the multi-unit complex.

As used herein, "smart home" refers to the installation, use and control of one or more smart devices and smart sensors operatively associated with one another within a single residential unit, such as an apartment, condominium, or office building. "Smart access" refers to the installation, use, access to, and control of access control features, e.g., smart devices, smart sensors, electronic credentials that allow access to common areas, amenities, facilities, and other features shared by residents, guests, and staff (e.g., property manager, maintenance personnel, etc.) of a multiple unit property. "Smart community" refers to systems and methods of the present technology for using certain smart devices and hardware to perform various community functions, collect and process information related to community usage, and access individual accounts to pay rent or book community amenities. A "user device" refers to any device having a central processing unit ("CPU") capable of performing computing functions and having the ability to communicate with other devices either through a wireless communication system or a wired communication system such as: smartphones, tablet computers, smart watches, laptop computers, desktop computers, or other similar devices.

A control system for managing smart devices in a multi-unit property environment may be configured to work with any number or type of controllable smart devices. Some controllable smart devices may be associated with a particular resident or unit within the property. For example, a residence within an apartment complex may include one or more individual resident controllable smart devices and sensors such as: light bulbs, light switches, fans, in-home electronic assistants, thermostats, door locks, appliances, window coverings, security cameras, monitoring sensors, and the like. Other community controllable devices may be associated with the entire multi-unit property and comprise devices such as: locks located at entry doors or gates, audio/video communication portals, motion sensors, video surveillance cameras, and the like.

The control system incorporates an integrated secure hardware and software solution comprising a smart home system for each individual unit within the multi-unit property, a smart access system for controlling common features within the multi-unit property, and a community system in a single consolidated platform and interface without the need for multiple apps and mobile electronic devices while addressing the unique needs of multiple unit dwelling residential properties not addressed by existing smart home solutions. Unlike a single-family home, smart home devices of the present technology may include an isolated network communication protocol to increase security by reducing the ability for the smart home devices in within a resident's individual unit to be controlled maliciously or mischievously by residents of other units, guests or by any other unauthorized parties.

Referring now to FIG. 1, a control system 100 for smart devices for a multi-unit property 120 may comprise at least one smart home system 102a, 102b associated with an individual unit, an access control system 104, and a smart community system 106. Each system may be configured to communicate over any suitable communication network 110 (e.g., wirelessly through wireless protocols, the internet, cellular, LAN, or other networks) with one or more of the other systems. An infrastructure control system 108 may be configured to control and manage each connected system. Individual users may be able to interact with the infrastructure control system 108 through a user interface provided in the form of at least one of a mobile software application 112 installed on a first user device 114a or through a web portal 116 accessible by a second user device 114b.

The mobile software application 112 comprises a software application including a digital interface for users to interact with the smart home system 102, the access control system 104, and the smart community system 106 through the user device 114. As part of smart home system 102, residents may control the resident controllable smart devices in their residential unit and can enable or disable alerts from any resident controllable smart sensors.

Figure 2:
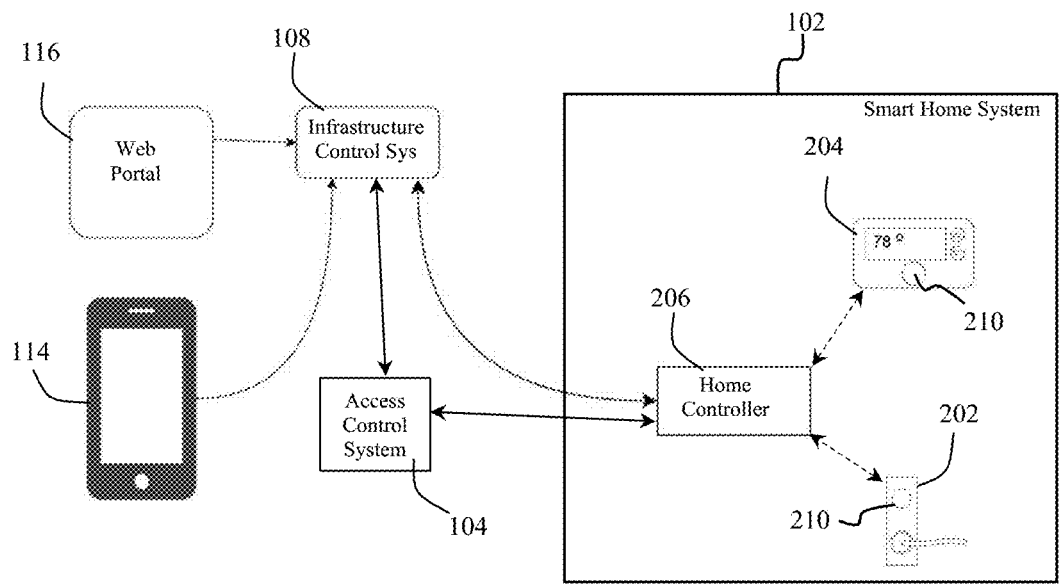
FIG. 2 representatively illustrates a block diagram of a smart home system in accordance with an exemplary embodiment of the present technology.

The smart home system 102 is configured to allow at least one resident to control or otherwise interact with the smart devices and sensors installed in or associated directly with their assigned unit. Referring now to FIG. 2, each smart home system 102 may comprise one or more resident controllable smart devices and smart sensors such as a front door lock 202, a thermostat 204, light bulb, light switch, security system, sensors (e.g., smoke, motion, carbon monoxide, water, etc.), or any number of other objects installed within a resident's unit that may be accessed or controlled remotely. A home controller 206 may be communicatively linked to each smart device and sensor within the unit and be configured respond to commands initiated from the mobile software application 112 on the user device 114. Commands from the user device 114 may be communicated through the infrastructure control system 108 and transmitted to the home controller 206. In some embodiments, commands from the user device 114 may be communicated directly from the user device 114 to the home controller 206 when the user device 114 is located within the resident's unit. The home controller 206 may also be responsive to signals received from the resident controllable smart devices and sensors and be configured to communicate the signals to the user device 114 via the infrastructure control system 108.

The home controller 206 may be configured to communicate with the resident controllable smart devices through any suitable method such as wired connections or wireless protocols including Z-wave, Bluetooth, Bluetooth low energy (BLE), near-field communication (NFC), 802.11, or any other similar wireless protocols. The home controller 206 may be configured to communicate with the infrastructure control system 108 through a secure application programming interface ("API") request via an ethernet network connection or through cellular uplink. In another embodiment, the home controller 206 may be located outside the residential unit and accessible by the resident through the mobile software application 112 or the web portal 116.

The access control system 104 may comprise one or more access control devices (e.g., hardware and software) that grant or restrict access to specific areas, provide for the management of guests and visitors to property perimeter access points, and package rooms for centralized management of package deliveries to residents. In one embodiment, at least one type of access control device may comprise security access credentials stored on the resident's user device 114 and accessible via the mobile software application 112. If the resident can enter the multi-unit property with an access credential stored on their user device 114, then no physical credentials (e.g., key, key fob, card) are needed.

The access control system 104 may allow residents, property managers, and guests to allow a user device to act as a smart credential. The smart credential may incorporate one or more wireless technologies such as NFC and BLE technologies, separately or in combination, to allow the user device 114 to perform a secure data exchange with a particular smart device to grant physical access to different areas of the multi-unit property, including individual residences, offices, common areas, and amenities. For example, the smart credential on the user device 114 may be recognized by one or more community controllable smart devices or the smart home system 102 such as: a NFC tag 210 located on a given device (FIGS. 2-4), an access control panel 702 (FIG. 7), a guest code access system, and a telephone entry system 800 (FIG. 8) which may be configured to communicate with each other and the user device 114 via the infrastructure control system 108. The smart credential may be tied to a resident's login information (or that of a guest) in the mobile software application 112, which can be managed by another user (e.g., resident or property manager), as described in more detail below.

Figure 3:
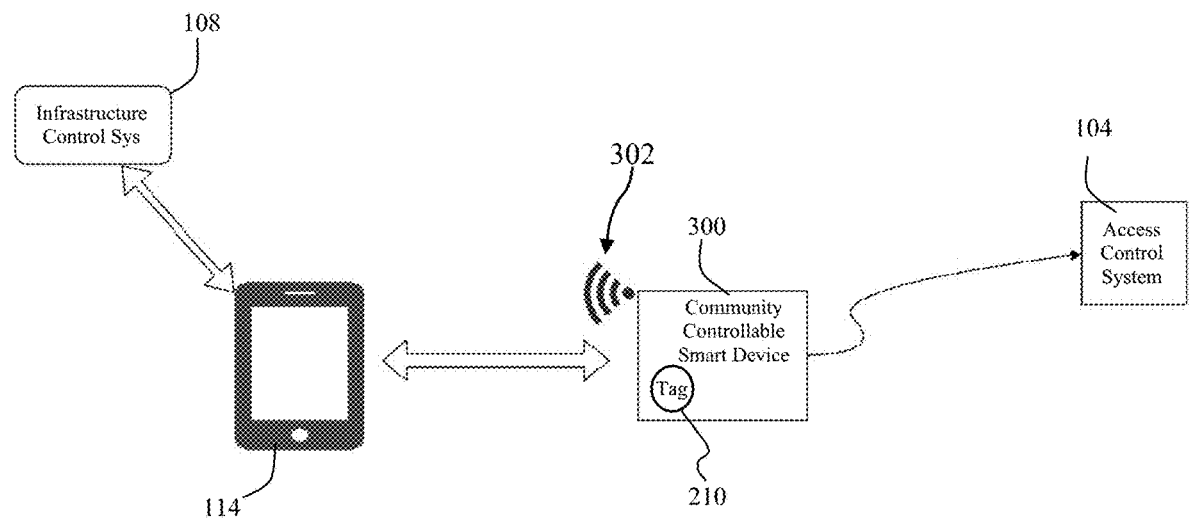
FIG. 3 representatively illustrates a block diagram of an embodiment of an access control system in accordance with an exemplary embodiment of the present technology.

With reference now to FIGS. 2 and 3, the NFC tag 210 may be placed on one or more resident controllable smart devices and smart sensors or community controllable smart devices 300 that may be controlled, actuated, or have data read from it within the multi-unit property or an individual residence. The access control system 104 may assign each NFC tag 210 with a unique identification code or tag along with a specified action that allows the user device 114 to authenticate the user's ability to interact with a given smart device or sensor 300. For example, the NFC tag 210 may comprise a uniform resource identifier ("URI") to prompt the mobile software application 112 to activate or otherwise respond to a set of information that is passed to the mobile software application 112 for an action. In response, the user device 114 may perform an authentication against the user, residence, and multi-unit property. If the authentication is approved, then a secure API request is made to the infrastructure control system 108 to allow the user device 114 to interact with that smart device or sensor 300. The ability of guests to interact with community controllable smart devices or a given smart home system may be limited to granted approvals provided via a guest access code system.

In one embodiment, a user device 114 may read a NFC tag 210 on the controllable smart device 300 having an assigned URI, device identifier ("ID"), and a set of action information. The URI causes the mobile software application 112 on the user device 114 to open. The device ID and action information are passed to the mobile software application 112, which validates whether the user device 114 (e.g., resident, guest, or property manager) has the authorization to control or monitor that particular smart device 300. If the user device 114 is authorized, the user device 114 initiates an API request to the infrastructure control system 108 which uses the device ID to map to the type of API request required for that particular device (e.g., smart door lock 202).

The NFC tag 210 may be permanently programmed or re-programmable. In some instances, the NFC tag 210 may be fixed to the outside of a smart device or attached via a shell or casing installed around or enclosing the smart device. For example, as shown in FIG. 2, on a smart door lock 202, the NFC tag 210 is fixed within a shell that is installed on an existing door. The enclosure may be configured to fit around existing locks from various manufacturers. When the mobile software application 112 reads the NFC tag 210, an unlock request may be initiated. In another embodiment, a padlock may comprise a NFC tag 210 affixed to an exterior surface of the padlock. When the mobile software application 112 reads the NFC tag 210 associated with the padlock, an unlock request may be initiated.

In yet another embodiment, a smart thermostat 204 for a common area may comprise a NFC tag 210 embedded inside a housing of the smart thermostat 204. When the mobile software application 112 reads the NFC tag 210, if the user device 114 is identified as having proper access, the user (e.g., property manager) may be given control of the thermostat 204. Similarly, if the NFC tag 210 is placed on a residential smart thermostat 204 and located within a given residence unit, then when the mobile software application 112 reads the NFC tag 210 it would give resident control of the smart thermostat 204.

Control of various smart devices may be controlled by user permission levels in the mobile software application 112, as well as a schedule implemented through the mobile software application 112. For example, a given permission level may be based on whether a specific user (e.g., property manager) is granted permission to enter a specific area of a property, or whether a given resident has been given authorization to use a particular device that is part of available community amenities (e.g., a smart door lock 202 that controls access to a spa or pool area).

The access control system 104 may comprise various embodiments of systems and methods for reading, authenticating, and permitting access to or control of community controllable smart devices by users that all have different credentials (e.g., multiple residents, guests, and property managers). As detailed below, securing communications between various user devices 114 and the smart devices located throughout the multi-unit property solve a technological problem associated with prior art smart devices in an unconventional way by using a unique combination of enhanced NFC and BLE communication protocols, coupled with private keys and a number used once ("nonce") mechanism for encrypted authentication messages. This process achieves secure data exchange between the user devices 114 and smart devices to overcome technical shortcomings with conventional smart devices. NFC as used with the present technology provides a security advantage when used in combination with BLE because NFC requires very close proximity (0-3 cm) which makes it difficult for man-in-the-middle ("MITM") attacks to which BLE may be susceptible given its range of up to several meters. Moreover, unlike existing technologies which require an internet connection to perform an authentication action, no internet connection is required with the access control system. A further advantage provided by the disclosed technology is that it obviates the need for residents to carry multiple authentication cards, key fobs, mobile devices and the like. Only a single user device 114 equipped with the mobile software application 112 is required. The access control system may also be configured to work with the web portal 116 accessed via another user device 114 such as a desktop or other CPU.

A first method of conducting a secure device-to-device communication between the user device 114 and a given smart device 300 utilizes a card reader to perform an initial communication by transmitting the NFC tag 210 (emulation or otherwise) and a unique random encryption nonce to the user device 114 over a NFC protocol. In response, an encrypted access request is communicated from the user device 114 to the smart device 300 over a BLE protocol using the received nonce. In this embodiment, the smart device 300 is be configured with a NFC tag 210 such that a user device 114 is configured to function and act as a NFC reader.

An alternative method of conducting a secure device-to-device communication transaction between the smart device 300 and the user device 114 may comprise an initial communication from the smart device 300 via the card reader of a unique random encryption nonce communicated to the user device 114 as a BLE advertisement. In response to this initial communication, the user device 114 communicates a NFC tag 210 comprising an encrypted access request to the smart device 300 using the nonce received over the BLE protocol. In this embodiment, the smart device 300 may be configured to function as a NFC reader, while the user device 114 emulates the NFC tag 210.

Yet another method of communicating between the user device 114 and a given smart device 300 may comprise performing a secure device-to-device communication through the use of a BLE connection from the smart device 300 to the user device 114 to send a nonce and an encrypted message between the community controllable smart device and the user device 114. This allows the user device 114 to generate an access control request or an authentication with the smart device 300 to manipulate or control it. Here, the smart device 300 is configured so that it only interacts with the user device 114 over BLE.

In one embodiment, the access control system 104 may be configured to assign a given community controllable smart device with a NFC tag 210 such that a user device 114 is configured to function and act as a NFC reader. In another embodiment, the access control system 104 may configure a given community controllable smart device 300 to function as a NFC reader, while the user device 114 is configured to function as the NFC tag 210. In yet another embodiment, the access control system 104 may configure a given community controllable smart device 300 so that it only interacts with a user device 114 over BLE. Although the foregoing embodiments are discussed with principal reference to a given community controllable smart device 300, the technology should not be viewed as being limited in this respect because each method could also be used in connection with one or more resident controllable smart devices and smart sensors connected to a smart home system 102.

For example, and referring now to FIG. 3, in one embodiment a user device 114 and a community controllable smart device 300 may communicate wirelessly either through a NFC or BLE signal 302. The user device 114 may communicate with the infrastructure control system 108 to synchronize a list of valid device IDs stored on the access control system 108. When the user device 114 performs a valid transaction with the community controllable smart device 300, the community controllable smart device 300 sends a user code to the access control system 104 and the user is allowed to control the community controllable smart device 300 with the user device 114. In another embodiment, instead of sending the user code to the access control system 104, the secure data exchange may also comprise allowing the user further control of the community controllable smart device 300 from the user device 114. One of skill in the art will recognize that any resident controllable smart device associated with the smart home system 102 may also function in the same manner as described above for the community controllable smart device 300.

With respect to secure data exchange between devices, as mentioned above, it is not required that the user device 114 be connected to a server over the internet to make an access request. In addition, the community controllable smart device 300 also can support other widely used credentials, such as 125 kHz, 13.56 MHz cards, key fobs, and other physical credentials.

Unlike prior art communication systems for smart devices, the disclosed method provides a novel solution in the manner in which it causes the system to issue and use a nonce for an encryption scheme that is resistant to MITM attacks or unwanted credential requests. Various embodiments of the disclosed communication method comprise transfer of the nonce from a first communication path and then transmission of an encrypted message on a second communication path. In one example of the disclosed technology, NFC may be used to either initiate the transaction or complete the transaction. But NFC is not used to perform bidirectional communication. For this reason, BLE may be used to supplement the transaction. In either embodiment, there may be various additional stages in the transaction, each providing an additional layer of security.

For example, the encryption itself may be implemented using various advanced encryption standard ("AES") schemes, such as: counter mode ("CTR"), output feedback ("OFB"), cipher feedback ("CFB"), plaintext cipher block chaining ("PCBC"), cipher block chaining ("CBC"), electronic codeblock ("ECB"), and the like. The access control system 104 may use any suitable type of encryption such as 128-bit, 196-bit, 256-bit, and 512-bit encryption using the same logic as would be familiar to one of ordinary skill in the art only after becoming familiar with the teachings of the present invention. For example, in a CTR mode encryption scheme, an incremental counter is not used and instead the nonce may comprise 128-bit random numbers for each transaction.

Figure 4:
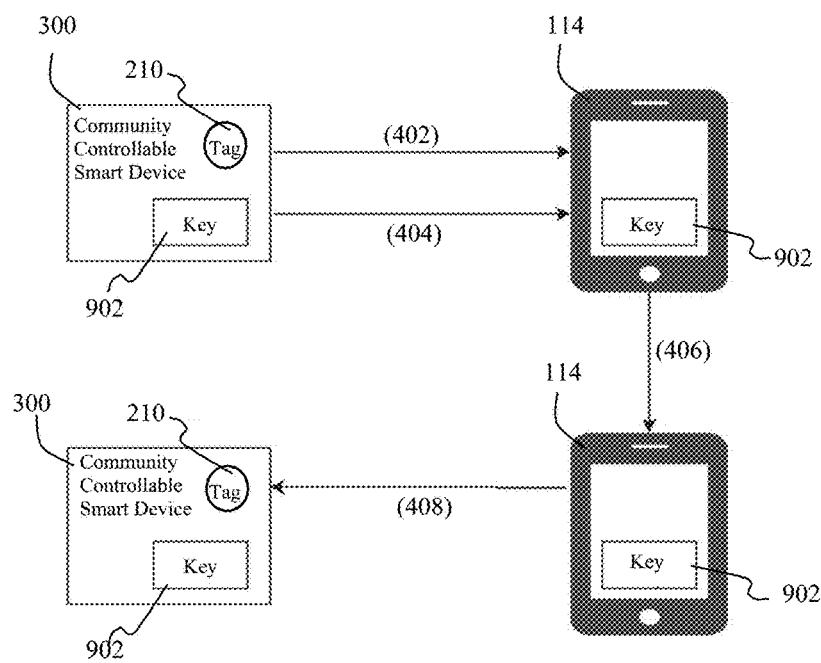
FIG. 4 representatively illustrates a block diagram illustrating an embodiment of a communication method of the access control system in accordance with an exemplary embodiment of the present technology.
Figure 5:
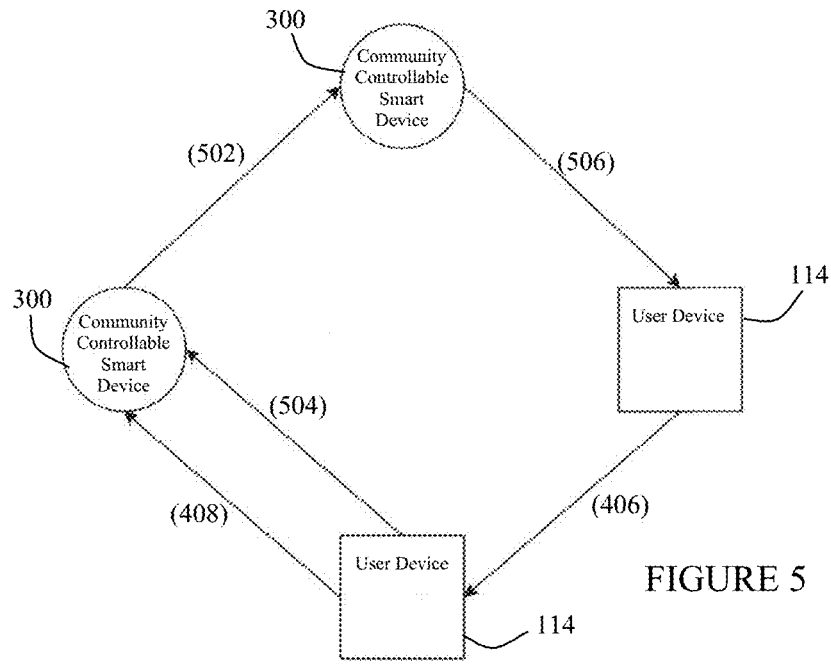
FIG. 5 representatively illustrates a block diagram illustrating an alternative embodiment of a communication method of the access control system in accordance with an exemplary embodiment of the present technology.

Referring now to FIGS. 4 and 5, in one embodiment, the first step of the transaction is for a community controllable smart device 300 to broadcast a unique device ID through a BLE advertisement (402). The mobile software application 112 provides the user device 114 with a list of known device IDs with which it is allowed to communicate. The user device 114 may repeatedly scan for all device IDs and display to the user (e.g., via graphic user interface ("GUI") of the mobile software application 112) if the community controllable smart device 300 matches one of the device IDs in the list of all permitted community controllable smart devices. Once a user has selected the desired community controllable smart device 300, the user device 114 starts an NFC scan. The user presents the user device 114 to the community controllable smart device 300 and the user device 114 reads the NFC tag 210 presented by the community controllable smart device 300. The access control system 104 may comprise a security measure to prevent someone from creating a false device in the list of all permitted community controllable smart devices with which the user device 114 could connect to and attempt a transaction with.

A second step of the transaction causes the user device 114 to read the data from the community controllable smart devices 300 acting as an NFC tag 210 (404). This data may comprise any suitable information or fields such as: a URI unique to the mobile software application 112 for interacting with the community controllable smart devices 300; a transaction header of 64 bits; or a 128-bit random number, which is used as the nonce. The transaction header may comprise a transaction type or connection mode. For example, the transaction header could indicate whether a transaction is purely BLE or a combination of NFC and BLE. A unique header may comprise a 64-bit long randomly picked bit pattern; however, the technology should not be viewed as being limited in this respect since the header may more or less than 64 bits.

The mobile software application 112 on the user device 114 may check that the transaction header matches a prearranged list of headers for a valid transaction or connection type. A non-shareable private encryption key 902 may exist on both the user device 114 and the community controllable smart devices 300.

In a third step, the user device 114 then uses the 128-bit nonce, as well as the private encryption key 902 to encrypt a message to be sent back to the community controllable smart devices 300 (406). The encrypted message comprises a transaction header and a user access code. The user access code could be Wiegand data or any access code up to 128 bits. The user device 114 then connects to the community controllable smart devices 300 over BLE and sends the encrypted message (408). If the process does not time out, disconnecting the community controllable smart devices 300 from the user device 114, then the community controllable smart devices 300 will decrypt the encrypted message using the nonce and private encryption key 902 (502).

The community controllable smart devices 300 may include BLE programming that requires any device that connects to it to send information over BLE within a set period of time, such as 2 seconds, although other set periods of time in a range of about 1-5 seconds could also be used. After the set period of time, the community controllable smart devices 300 will automatically disconnect if the required information is not sent (504). This disconnect shortens time period someone can maliciously attempt to send transactions to the community controllable smart devices 300 in an attempt to circumvent the secured communication.

When the user device 114 reads the NFC tag 210 from the community controllable smart devices 802 (404), the community controllable smart devices 300 starts a pre-programmed countdown. The pre-programmed countdown may be set to a short amount of time, such as 10 seconds; however, other short amounts of time could also be designated, e.g., 1-15 seconds. If the community controllable smart devices 300 does not receive a valid BLE transaction from the user device 114 within the pre-programmed countdown, then the nonce is automatically reset (506) and any transactions using the previous nonce are invalidated. Additionally, after each transaction attempt, the pre-programmed countdown will be repeated, and the nonce will be reset resulting in a second time out.

This second time out associated with the pre-programmed countdown also reduces the time period someone can maliciously attempt to unravel the transaction and encryption scheme. To unravel the scheme without knowing private encryption key 902, a brute force attack would be required to guess the private encryption key 902. However, since the community controllable smart devices 300 resets the nonce after each transaction attempt, an attacker would need to repeatedly read a new nonce over NFC, attempt a decryption, and transmit it over BLE. A forced delay may also optionally be implemented to cause the NFC tag 902 to update only after a set time delay, e.g., 2 seconds. Since the combination of this forced delay, the NFC read, and the BLE transaction would not take an insignificant amount of time, on the order of several seconds, it would be increasingly difficult for a user, or even an automated program to perform a brute force attack to determine private key 902. In addition, when this technology is implemented there may be an additional layer of security in the user code which is a unique code for that user to enter a specific door at a given time.

Because one of the transactions uses NFC (which requires close proximity), and the other uses BLE, someone trying to decipher the encryption and transaction scheme would need to intercept both messages simultaneously. This would likely require the physical installation of a device on or inside the community controllable smart devices 300 to read the NFC data (e.g., NFC tag 210) as well as a BLE device to pick up the wireless BLE transaction. Though not impossible, this is another security measure to reduce the ability for someone to gain unwanted access.

Figure 6:
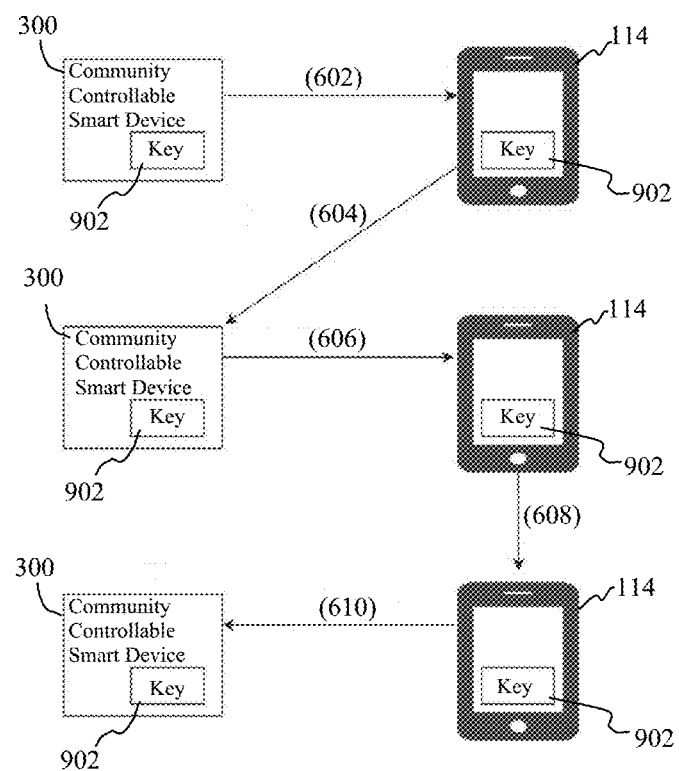
FIG. 6 representatively illustrates a block diagram illustrating another embodiment of a communication method of the access control system in accordance with an exemplary embodiment of the present technology.

Referring now to FIGS. 5 and 6, a first step in the transaction of the community controllable smart devices 300 may broadcast a unique device ID through a BLE advertisement (602). As detailed above, the user device 114 may comprise a list of known community controllable smart device IDs with which the user device 114 is allowed to communicate. Again, once the user has selected the desired community controllable smart device 300, the user device 114 connects to the selected community controllable smart devices 300 (604) over BLE and reads the transaction header (described above), as well as the 128-bit nonce (606).

The user device 114 may then check that the transaction header matches a prearranged list of headers for a valid transaction or connection type. The private encryption key 902 exists on both the user device 114 and the community controllable smart device 300. The user device 114 then uses the 128-bit nonce, as well as private encryption key 902 to encrypt a message to be sent back to the community controllable smart device 300 (608). The message contains a transaction header and a user access code. As outlined above, the user access code could be Wiegand data or any access code up to 128 bits.

The user device 114 may then emulate the NFC tag 210 with the following information: a transaction header of 64 bits and a 128-bit encrypted message containing the user code. The technology should not be viewed as being limited in this respect since different sized transaction headers and encrypted messages could also be used. Subsequently, the user device 114 may be presented to the community controllable smart device 300, which reads the NFC tag 210 (610). The community controllable smart device 300 then decrypts the message (502), verifies the transaction header, and sends the user code to an access control panel for verification.

As similarly described above, the community controllable smart device 300 BLE programming requires any device that connects to it to send information via NFC within a short period of time. After the set period of time, the community controllable smart device 300 will automatically disconnect if the required information is not sent. This disconnect shortens the opportunity of time someone can maliciously attempt to send transactions to the community controllable smart device 300. As previously described, if the community controllable smart device 300 does not receive a valid NFC transaction from the user device 114 within the set period of time, then the nonce is automatically reset and any transactions using the previous nonce are invalidated.

With continued reference to FIGS. 5 and 6, in yet another embodiment of a secure method of communication, the first several steps in the transaction may be the same as described above (602), (604), (606), and (608). In this instance, however, the user device 114 causes a BLE message to be sent to the community controllable smart device 300. The BLE message may comprise a transaction header of 64 bits and a 128-bit encrypted message containing the user code (610), although the invention should not be viewed as being limited in this respect as different sized transaction headers and encrypted messages could also be used. The community controllable smart device 300 may then decrypt the BLE message, verify the transaction header, and send the user code to an access control panel for verification (502). Again, as described above, the community controllable smart device 300 may be programmed to require communications to be sent within a specified period of time or a disconnect procedure will take place and the nonce will be reset.

The community controllable smart device 300 may also be configured to accept a key fob or other physical credential in place of a smart credential. In this embodiment, data sent from a user device 114 to a NFC reader may comprise a unique access code. The NFC reader may transmit the access code to the access control system 104 via a Wiegand protocol; however, the technology should not be viewed as being limited in this respect since other access control protocols, such as OSDP, for example, could also be used. The NFC reader may also be configured to require NFC and BLE data exchange or just BLE exchange. By way of a nonlimiting example, BLE exchange may be employed at a vehicle gate where distance between the NFC reader and the user device 114 can exceed 10 meters. An additional layer of security includes authentication of a unique device ID for the NFC reader against resident and property in the manner previously described.

The access control system 104 may also be used to control permissions given to guests and other visitors with respect to entry points to the multi-unit property, community amenities, and individuals residences. Therefore, the access control system 104 may comprise a guest code access system configured to manage the creation and distribution of guest codes to non-residents of the multi-unit property and a telephone entry system configured to put guests in contact with a resident or staff of the multi-unit property.

Figure 7:
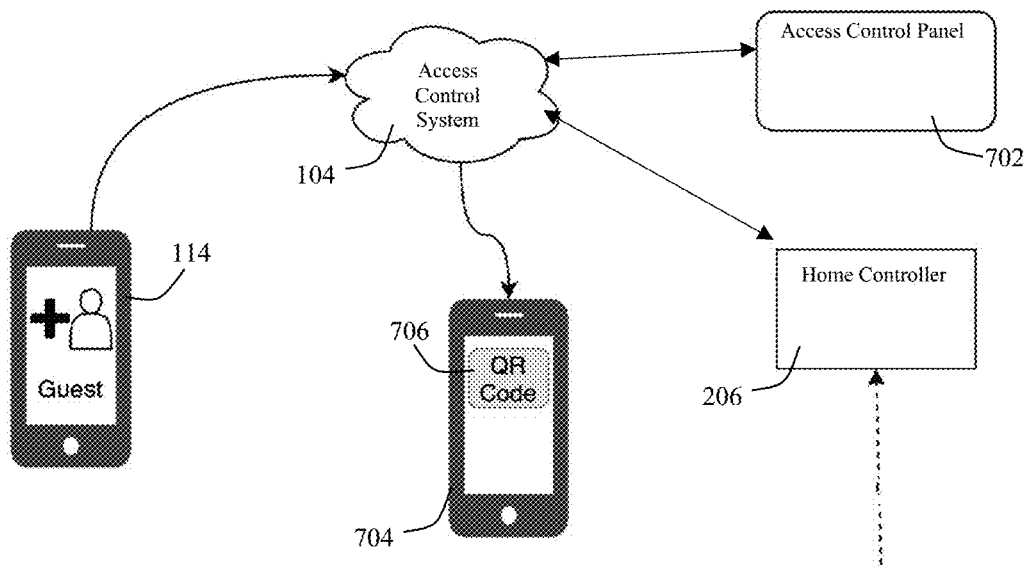
FIG. 7 representatively illustrates a guest access system in accordance with an exemplary embodiment of the present technology.
Figure 7:
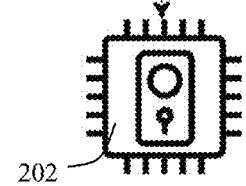

Referring now to FIG. 7, the guest code access system may comprise any suitable system or device configured to add, remove, or modify access to property perimeter entrances, community amenities, and individual residences to non-residents of the multi-unit property. In one embodiment, the guest code access system may be accessible by a resident or property manager through mobile software application 112 or the web portal 116. The access control system 104 may present the guest code access system to the user via the GUI having data entry fields to request to add a guest to a property and/or residence. The access control system 104 may assign varying permission levels for the requested guest according to the data entered into the guest code access system. For example, if the request includes that the guest be given access to both the property perimeter entrances and a particular residence within the multi-unit property, then the guest may be added to the access control panel 702 for one or more entrance points for the multi-unit property, as well as the home controller 206 and front door lock 202 corresponding to the smart home system 102 for the identified residence.

Once the guest credential has been confirmed added, the access control system 104 may generate a message that is communicated to the guest. For example, the access control system 104 may send a SMS message to a user device 704 owned by the guest. In one embodiment, the message may include a QR code 706 and numeric code for entering the property and residence. The guest's access may be controlled or otherwise managed by any suitable method or criteria. For example, the access control system 104 may set a default number of days that the guest credential remains valid. Alternatively, the user creating the guest credential may be able to define a schedule and set the guest credential to expire after a set amount of time. As another example, a guest may be given access to certain community amenities at specified periods of the day or week or they may be only allowed to enter the multi-unit property through specified entry points.

Figure 8:
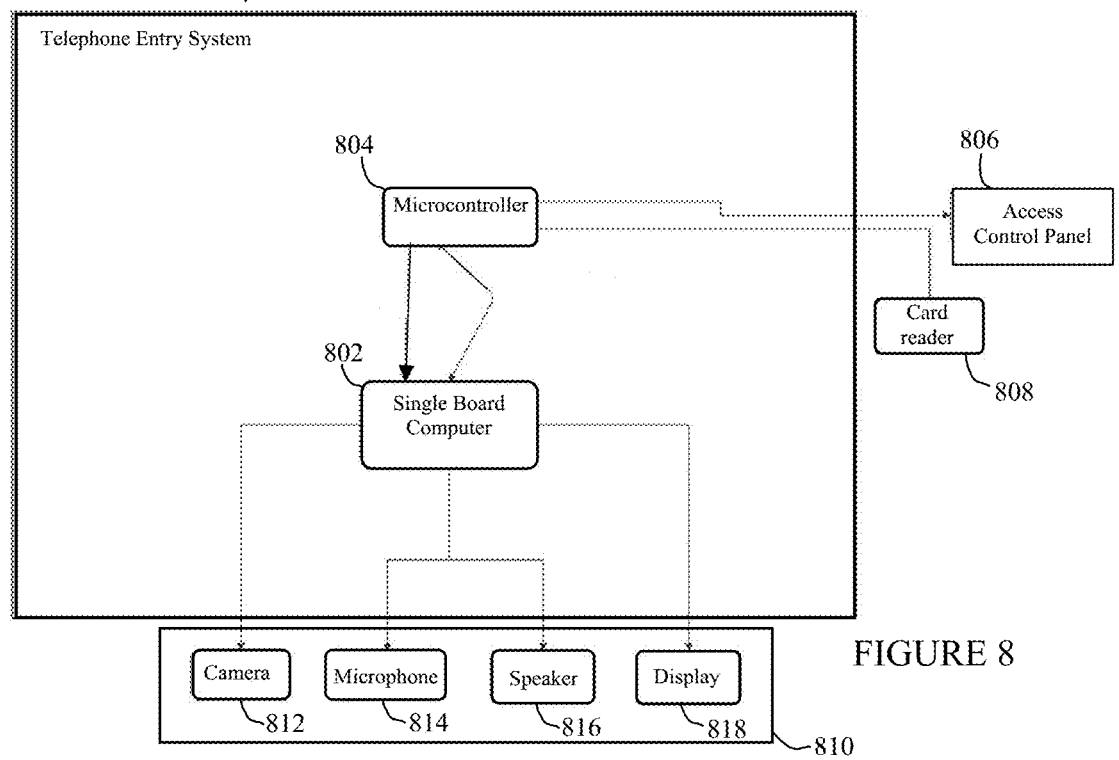
FIG. 8 representatively illustrates a telephone entry system in accordance with an exemplary embodiment of the present technology.

Referring now to FIG. 8, the telephone entry system 800 may comprise various hardware and software embedded with instructions and be configured to communicate with any other system or device such as the guest code access system. In one embodiment, the telephone entry system 800 may allow a visitor to the multi-unit property to make a call or send a message to a resident to let them through a nearby access/entry point. The telephone entry system 800 may comprise any suitable system or device for managing a communication between a particular location and the location of the intended call and sending an appropriate signal to a community controllable smart device associated with the telephone entry system 800. For example, in one embodiment, the telephone entry system 800 may comprise a single board computer 802, a microcontroller 804, an access control panel 806, a card reader 808, and an intercom system 810. The intercom system 510 may further comprise a video camera 812, a microphone 814, speaker 816, a display screen 818, and a network connection.

The intercom system 810 allows authorized persons to enter the multi-unit property and guests to call a resident or property manager. The intercom system 810 may also be configured to accept various types of credentials such as: a multi-digit pin credential, a smart credential, a key fob credential, or QR code 706. The intercom system 810 may also be configured to make video calls from the unit to a resident's user device 114 via the mobile software application 112, or a Voice over IP (VoIP) call to the phone number of a resident or property manager. The intercom system 810 may also communicate with the access control system 104 by making an access control request to a connected access control panel 806. In one embodiment, the intercom system 810 may also be configured to store a database of users and user codes to operate independently of the access control panel 806.

Figure 9A:
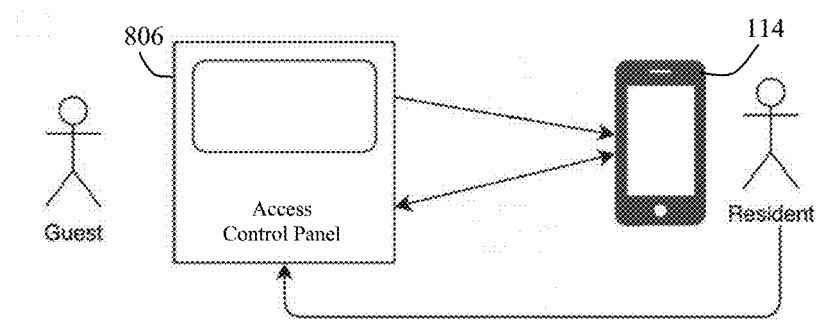
FIG. 9A representatively illustrates a video call of the telephone entry system shown in FIG. 8 in accordance with an exemplary embodiment of the present technology.
Figure 9B:
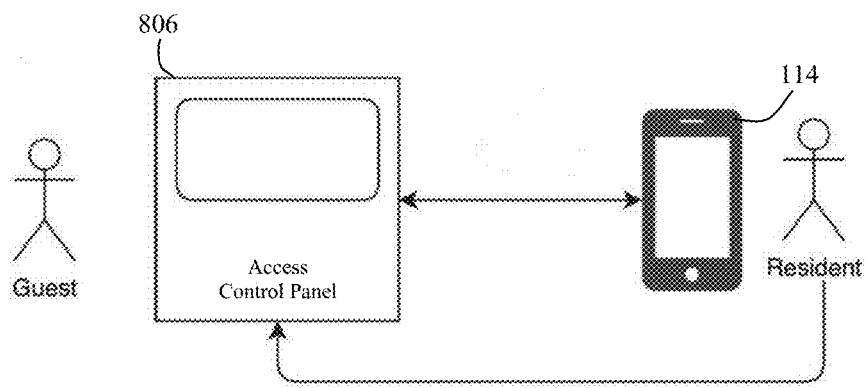
FIG. 9B representatively illustrates a VOIP call of the telephone entry system shown in FIG. 8 in accordance with an exemplary embodiment of the present technology.
Figure 9C:
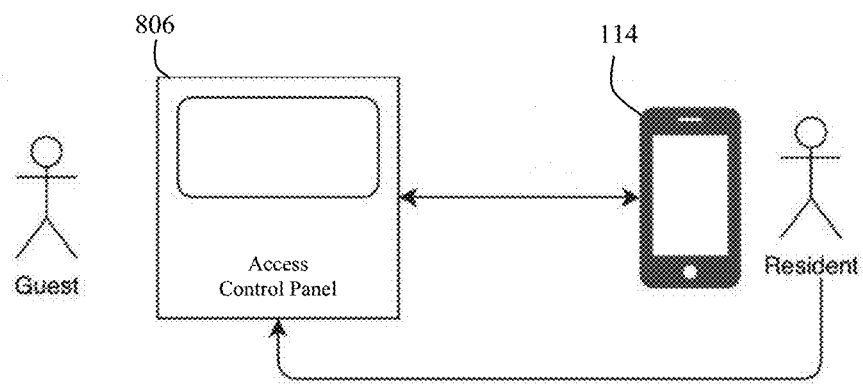
FIG. 9C representatively illustrates a text message of the telephone entry system shown in FIG. 8 in accordance with an exemplary embodiment of the present technology.

With reference to FIG. 9A, when a guest at the intercom system 810 makes a video call to a resident to request access, a one-way video/two-way voice call is initiated. The resident may then choose to admit or deny the user entry through the access point. In another embodiment, as shown FIG. 9B, a guest may initiate a VoIP call to the user device 114 of a resident via a telephone number associated with the user device 114. The resident may communicate with the guest over a two-way voice call and the resident may admit or deny the user entry through the access point. In yet another embodiment as shown in FIG. 9C, the guest at the intercom system 810 may initiate a text message conversation with a resident. The resident may respond via text message to admit or deny the user entry through the access point.

The smart community system 106 represents a collection of community controllable smart devices 300 directed towards features and amenities provided to an entire community of residents of the multi-unit property. The smart community system 106 may comprise any suitable type of smart devices and smart sensors, the combination of which may be generically referred to as community controllable smart devices. These community controllable smart devices may comprise devices such as: locks located at entry doors or gates, audio/video communication portals, motion sensors, video surveillance cameras, and the like.

Figure 10:
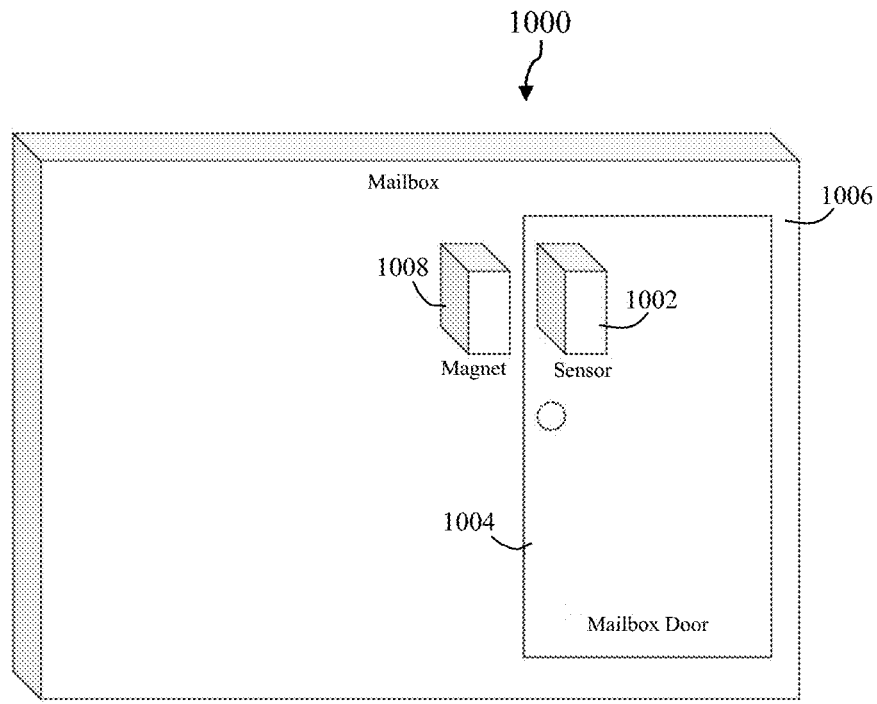
FIG. 10 representatively illustrates a mailbox monitoring system in accordance with an exemplary embodiment of the present technology.

Referring now to FIG. 10, in one embodiment, the smart community system 106 may further comprise a mailbox delivery detection system 1000 configured to detect a mail delivery event and send a notification to one or more residents. In one embodiment, the mailbox delivery detection system 1000 may comprise a plurality of sensors configured to detect the mail delivery event in one or more individual resident mailboxes located within a larger unit mailbox 1006. A door sensor 1002 may be placed on one or more of the doors that are used by delivery people to put the mail or other packages in each mailbox. An individual door sensor 1002 may be attached to each mailbox door 1004 of the unit mailbox 1006. The door sensor 1002 may be tripped or triggered by any suitable method. For example, a magnet 1008 may be attached to the unit mailbox 1006 proximate to each mailbox door 1004 to be detectable by each door sensor 1008 when the mailbox door 1004 is closed. The placement of magnet 1008 in relation to the door sensor 1002 is configured to cause the door sensor 1002 to trip when the mailbox door 1004 is opened, breaking the connection between the two.

When most or all of the door sensors 1002 for the unit mailbox 1006 have been tripped, the mailbox delivery detection system 1000 may generate a notification message that is sent via the infrastructure control system 108 to each resident letting them know that the mail has been delivered. Alternatively, the mailbox delivery detection system 1000 may be configured to only generate and send the notification message to those residents whose mailbox sensor 1002 has been tripped.

Figure 11:
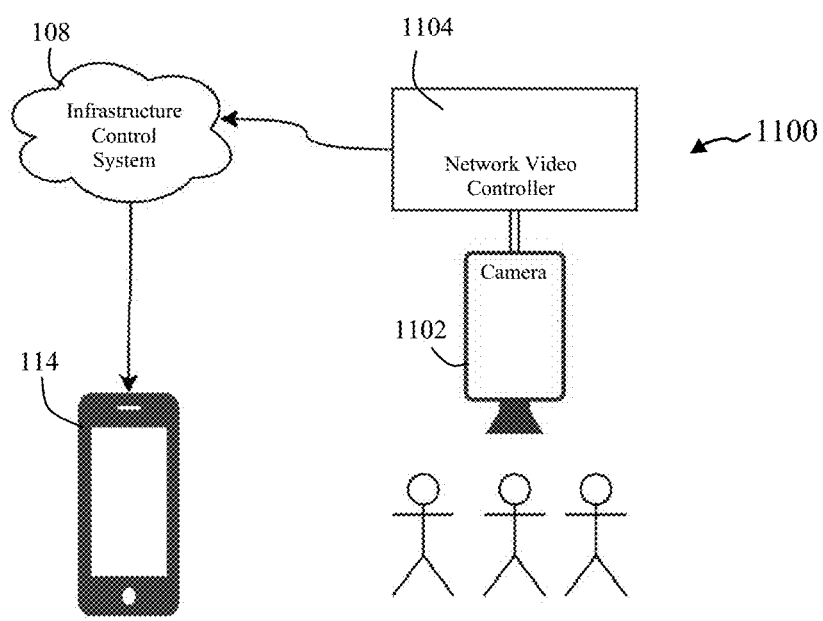
FIG. 11 representatively illustrates a traffic detection system in accordance with an exemplary embodiment of the present technology.

Referring now to FIG. 11, the smart community system 106 may further comprise a traffic detection system 1100 configured to give an indication to a resident how crowded a common area or amenity is before the resident ventures out to use the common area of amenity. For example, if the resident wanted to know if the tennis courts were completely occupied or if there were any chairs still available at the swimming pool, the traffic detection system 1100 could be used.

The traffic detection system 1100 may comprise any suitable system or device for detecting traffic. In one embodiment, the traffic detection system 1100 may comprise a camera 1102, a network video controller 1104 equipped with people counting algorithm. The traffic detection system 1100 may also be communicatively linked to the infrastructure control system 108 and be configured to transmit traffic data to a resident's user device 114 via the mobile software application 112. For example, video or still images captured by the camera 1102 may be analyzed by the traffic detection system 1100 to create an estimate of the number of people located within a common area or amenity, enabling residents to know approximately how busy that common area or amenity is at any given time. The network video controller 1104 may transmit the estimate to the infrastructure control system 108 on a periodic basis at predetermined intervals or in response to a specific query from a resident. The infrastructure control system 108 may be configured to generate one or more types of reports for the residents and property managers to know various metrics about usage such as how occupied the amenity areas are on the property are at a given day and time, the busiest times for each amenity or common area, or any other suitable criteria. Generated reports may be accessible through the mobile software application 112 or web portal 116.

The smart community system 106 may also include a hyper local social networking platform directed towards providing residents information relating to local merchants and discounts, announcements posted by property managers, participation in a resident discussion board, RSVP and pay for community events, submitting maintenance requests, viewing amenity details, reserving and paying for amenities, and viewing traffic/usage of common areas or amenities. The smart community system 106 may also allow residents to view answers to frequently asked questions about the community or submit a new question or problem report. Residents may also be able to manage their notification settings, payment settings, video call settings, contact information, and login information.

The access control system 104 allows residents to lock or unlock the front door lock 202 of their residential unit, change their lock code, unlock perimeter gates, and view a property perimeter gate code. A smart credential may be used along with a combination of NFC and BLE protocols technologies to allow user devices 114 to perform a secure data exchange to grant physical access to different areas of the multi-unit property such as a property perimeter gate, unit door, or a common amenity area. The mobile software application 112 a resident or property manager to add a guest and assign guest credentials.

The web portal 116 comprises firmware and software equipped with instructions that provides a digital interface for users to interact with the smart home system 102, the access control system 104, and the smart community system 106 through a web browser. For example, in one embodiment, a property manager with appropriate permissions may use the web portal 116 to: manage properties; manage residential units and residents (including a resident directory); monitor the status of batteries used in smart devices and sensors; control various resident or community smart devices; set automation schedules for vacant units; manage access control settings (including areas, doors/gates, schedules, profiles, and access points); manage guests and view access logs; manage amenity descriptions and reservation settings; post announcements; post events and manage event registration details; participate in the resident discussion board and curate discussion posts; configure outside product/service providers who can participate in property events and optionally be paid out of event proceeds; and, manage settings for system.

The infrastructure control system 108 may comprise a server-based software platform that provides the following core services: manage information about individual multiple unit dwelling properties and their residents; manage information about smart devices, smart sensors, and controllers associated with the property or with individual residential units within that property; manage information about the access configuration, access points, and intercom system 810 stations at a property; manage data associated with the smart home system 102, the access control system 104, and the smart community system 106; manage signals going to and from individual smart devices and sensors at a property; manage signals going to and from the user-facing mobile software application 112 and web portal 116 digital interfaces via user devices 114 or other computers; manage interactions or integrations within any third-party platforms or tools; and log details of all interactions in real time as they happen.

The particular implementations shown and described are illustrative of the technology and its best mode and are not intended to otherwise limit the scope of the present technology in any way. Indeed, for the sake of brevity, conventional manufacturing, connection, preparation, and other functional aspects of the system may not be described in detail. Although embodiments of the present technology have been described with reference to multi-unit dwelling properties, the technology should not be viewed as being limited in that respect. As would be familiar with one of ordinary skill in the art after becoming familiar with the teachings of the present technology, the subject matter could also be used to any multiple unit property, such as office buildings, co-working spaces, office suite facilities, continuing care facilities (e.g., nursing homes, assisted living communities), and the like.

Although existing smart home systems may separately include some discrete aspects of the technology, they do not include all the features and do not provide them in a seamlessly integrated manner, resulting in confusion and frustration for both residents and property managers. In addition, while some existing smart home systems may offer a technology integration between different platforms, this at best can only approximate a combined technology, along with the increased costs and complexity that comes with paying for and managing multiple platforms, devices and access credentials. Similarly, existing smart community solutions typically depend on email and web portals as the primary method of interaction, which is cumbersome and time-consuming for users who may rely primarily or even exclusively on their smartphone or other portable computing device for digital interactions and would prefer interaction through a mobile app, SMS messages, or smartphone notifications.

The present technology also offers significant security protections over existing smart home systems. Existing smart home systems typically rely on controllers powered by consumer-grade single-board computers that are susceptible to hacking, which could result in exploiting smart locks to provide access to unwanted parties, particularly in multiple unit dwelling communities. In addition, many smart home devices, sensors and controllers rely on WiFi and thus are susceptible to hacking through the many existing methods available for gaining unauthorized access to wireless networks and devices. These WiFi dependent devices and systems cannot operate if the property's network goes down or if interference causes a poor signal connection. In contrast, the systems and methods of the present invention are not tied to WiFi.

As described herein, embodiments of each disclosed system have been described as being integrated within a single system and variously with each other; however, the technology should not be viewed as being limited in this respect. In some embodiments, each system may comprise a stand-alone system such that they may each be employed separately or in various combinations with one another or as integrated with other types of smart access systems.

The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the components and/or elements recited in any apparatus embodiment may be assembled or otherwise operationally configured in a variety of permutations to produce substantially the same result as the present technology and are accordingly not limited to the specific configuration recited in the specific examples.

As used herein, the terms "comprises," "comprising," or any variation thereof, are intended to reference a non-exclusive inclusion, such that a process, method, article, composition or apparatus that comprises a list of elements does not include only those elements recited but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same. Any terms of degree such as "substantially," "about," and "approximate" as used herein mean a reasonable amount of deviation of the modified term such that the end result is not significantly changed. For example, these terms can be construed as including a deviation of at least ±5% of the modified term if this deviation would not negate the meaning of the word it modifies.

The present technology has been described above with reference to exemplary embodiments. However, changes and modifications may be made to the exemplary embodiments without departing from the scope of the present technology. These and other changes or modifications are intended to be included within the scope of the present technology, as expressed in the following claims.

The invention claimed is:

1. A control system for managing smart devices in a multi-unit property, comprising:
    a smart home system installed within each unit of the multi-unit property, wherein each smart home system comprises:
        a resident controllable front door lock;
        a plurality of resident controllable smart devices installed within the unit; and
        a home controller communicatively linked to the resident controllable front door lock and each resident controllable smart device in the unit;
    a smart community system comprising a plurality of community controllable smart devices and smart sensors installed throughout the multi-unit property;
    an access control system configured to communicate with the plurality of community controllable smart devices and the home controller of each smart home system;
    an infrastructure control system communicatively linked with the smart home system of each unit, the plurality of community controllable smart devices and smart sensors, and the access control system, wherein the infrastructure control system is configured to:
        store and manage data associated with each smart home system, the smart community system, and the access control system;
        manage communications between the plurality of community controllable smart devices and the access control system; and
        assign control of the smart home system to at least one resident of each unit; and
    a user access system configured to allow a user device to communicate with the infrastructure control system to allow the at least one resident to:
        control the plurality of resident controllable smart devices associated with the smart home system of their unit by using the user device to send commands to the home controller of their unit; and
        communicate with the access control system to interact with at least a portion of the plurality of community controllable smart devices and smart sensors.

2. A control system for managing smart devices in a multi-unit property according to claim 1, wherein the user access system comprises:
    an application software system configured to be installed on the user device; and
    a web portal.

3. A control system for managing smart devices in a multi-unit property according to claim 2, wherein the web portal is configured to:
    provide a secure management system for controlling the smart home system, the smart community system, and the access control system; and
    monitor a status of each smart home system and the smart community system.

4. A control system for managing smart devices in a multi-unit property according to claim 1, wherein the infrastructure control system is further configured to:
    manage information about each unit and information corresponding to the at least one resident; and
    secure communications between the user device, the access control system, the smart home system, and the smart community system.

5. A control system for managing smart devices in a multi-unit property according to claim 1, wherein the access control system is further configured to:
    create a temporary guest access credential for an identified guest in response to a request from the user access system; and
    provide the temporary guest access credential to a second user device associated with the identified guest.

6. A control system for managing smart devices in a multi-unit property according to claim 5, wherein the guest credential is added to the access control system to allow the identified guest to control one or more community controllable smart devices and smart sensors.

7. A control system for managing smart devices in a multi-unit property according to claim 1, wherein the infrastructure control system comprises a management system configured to allow a user to:
    controllably manage the assignment of each smart home system;
    manage control of the plurality of community controllable smart devices; and
    create a temporary guest access authorization for at least one of an identified smart home system and one or more community controllable smart devices.

8. A control system for managing smart devices in a multi-unit property according to claim 1, wherein each smart home system further comprises a plurality of smart sensors located in the unit.

9. A control system for managing smart devices in a multi-unit property according to claim 1, wherein the smart community system further comprises a hyper local social networking platform accessible by the user access system.

10. A control system for managing smart devices in a multi-unit property according to claim 1, wherein the smart community system further comprises a traffic detection system.

11. A control system for managing smart devices in a multi-unit property according to claim 1, wherein the smart community system further comprises a mailbox delivery detection system.

12. A control system for managing smart devices in a multi-unit property according to claim 1, wherein at least one community controllable smart device is configured to conduct a secure communication transaction with the user device, wherein:
    a first communication between the community controllable smart device and the user device occurs over a first communication path;
    a second communication between the community controllable smart device and the user device occurs over a second communication path; and
    a third communication between the community controllable smart device and the user device occurs over a third communication path, wherein the third communication path comprises a different wireless protocol than the second communication path.

13. A control system for managing smart devices in a multi-unit property according to claim 12, wherein:
    the first communication comprises broadcasting a unique device ID through a Bluetooth low energy (BLE) advertisement from the community controllable smart device to the user device;

the second communication comprises communicating the identification data of a NFC tag from the community controllable smart device to the user device using a NFC protocol; and the third communication comprises communicating an access request and a nonce from the user device to the community controllable smart device using a BLE protocol.

14. A control system for managing smart devices in a multi-unit property according to claim 12, wherein:

the first communication comprises broadcasting a unique device ID through a Bluetooth low energy (BLE) advertisement from the community controllable smart device to the user device;

the second communication comprises communicating the identification data of a NFC tag from the community controllable smart device to the user device using a NFC protocol; and the third communication comprises communicating an access request and a nonce from the user device to the community controllable smart device using a BLE protocol.

15. A control system for managing smart devices in a multi-unit property according to claim 12, wherein the secure communication transaction will time out if the third communication does not occur within a predetermined time frame after the second communication.

* * * * *